H. H. FETTA & S. D. TUTTLE.
WAGON-AXLE SKEIN.

No. 170,074.  Patented Nov. 16, 1875.

Witnesses:
A. Ruppert
A. C. Cassell

H. H. Fetta
S. D. Tuttle
Inventor.
D. P. Holloway & Co
Atty

UNITED STATES PATENT OFFICE.

HENRY H. FETTA, OF RICHMOND, INDIANA, AND STERLING D. TUTTLE, OF EATON, OHIO.

IMPROVEMENT IN WAGON-AXLE SKEINS.

Specification forming part of Letters Patent No. 170,074, dated November 16, 1875; application filed March 31, 1875.

*To all whom it may concern:*

Be it known that we, HENRY H. FETTA, of Richmond, county of Wayne and State of Indiana, and STERLING D. TUTTLE, of Eaton, county of Preble and State of Ohio, have invented an Improved Axle-Skein, of which the following is a specification:

This invention relates to an improvement in the mode of securing the wheel upon the axle-skein; and it consists in the employment of a washer slipped upon the projecting end of the axle-skein, so that it cannot turn thereon, and kept in place by means of the spring-bow, or bolts passed through the axle-skein in front of the washer, all as will be more fully described hereinafter.

Figure 1:
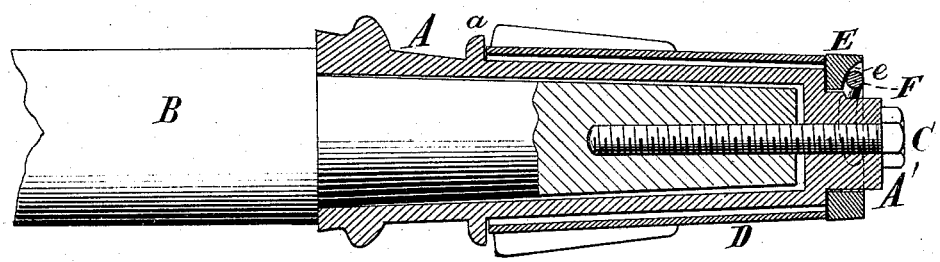
Figure 2:
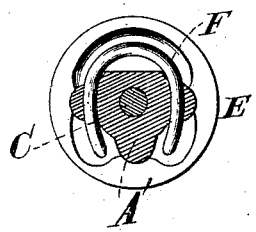
Figure 3:
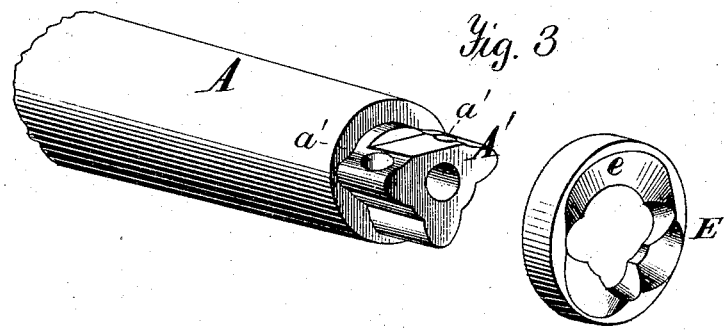

In the annexed drawings, Figure 1 is a longitudinal section of our improved axle-skein. Fig. 2 is a transverse section through the outer end thereof, showing the manner of securing the washer. Fig. 3 is a perspective view to illustrate more fully the construction of the outer end of the skein and washer.

The same letters of reference are used in the designation of identical parts.

The skein A is secured upon the wooden axle B by means of a wood-screw, C, as shown clearly in Fig. 1. D refers to the box, fixed in the hub of the wheel in the usual way, and turning upon the circular portion of the tapering axle-skein, between the collar *a* thereon and the washer E.

The outer end of the axle-skein terminates in an irregularly-formed head, A', upon which the washer E is fitted. This head is shown to be of approximately triangular form in this instance, and is provided with apertures *a' a'*, passing through its horizontal rings, for the reception of a bolt-spring, F, intended to lock the washer in position.

The apertures *a'* are so disposed that the bow F, when placed in position, is seated in a concavity, *e*, formed in the face of the washer E, and the bow is curved in such a manner that it requires to be sprung apart a little to enter the holes *a'*, and will then lock itself in the head A'.

We do not propose to confine ourselves to the particular kind of a spring and means for holding it to lock the washer hereinbefore described.

Other forms of springs secured on the head of the skein in different ways may be used instead without departing from the principle of our invention, which consists, namely, in the use of a non-revolving washer suitably secured on the skein, so that it may be readily removed to unlock the wheel.

It is immaterial what form is given to the head A' of the skein, so long as it is capable of preventing the turning of the washer upon it, and affords means for holding the device, whatever it be, for locking the washer.

Our invention possesses several advantages over the ordinary method of securing a wheel upon a skein by means of a nut. For instance, the skein and the washer can be cast to fit without any dressing; they may be cast of harder iron, because no thread needs to be cut on the head of the skein, and the fastening is very much stronger, and more durable.

What we claim as our invention, and desire to secure by Letters Patent, is—

The combination of the axle-skein A, provided with head A' *a' a'*, concaved washer E *e*, and spring-bow F, substantially as and for the purpose set forth.

In testimony whereof we have signed our names to this specification in the presence of two subscribing witnesses.

HENRY H. FETTA.
    STERLING D. TUTTLE.

Witnesses:
  LEWIS D. STUBBS,
  MARTIN O'DONNELL.